United States Patent
Xu et al.

(10) Patent No.: US 8,134,504 B2
(45) Date of Patent: Mar. 13, 2012

(54) COMMUNITY ANTENNA SYSTEM IN THE CLOSED LOOP MODE AND THE METHOD THEREOF

(75) Inventors: Xiaodong Xu, Beijing (CN); Guangyi Liu, Beijing (CN); Chunfeng Cui, Beijing (CN); Zhigang Yan, Beijing (CN); Yuhong Huang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 232 days.

(21) Appl. No.: 12/629,003

(22) Filed: Dec. 1, 2009

(65) Prior Publication Data

US 2010/0164804 A1 Jul. 1, 2010

Related U.S. Application Data

(63) Continuation-in-part of application No. PCT/CN2008/001069, filed on May 30, 2008.

(30) Foreign Application Priority Data

Jun. 1, 2007 (CN) .......................... 2007 1 0099978

(51) Int. Cl.
*H01Q 3/01* (2006.01)
(52) U.S. Cl. ........................................... 342/377
(58) Field of Classification Search .................... 342/377
See application file for complete search history.

(56) References Cited

U.S. PATENT DOCUMENTS

| | | | |
|---|---|---|---|
| 6,470,192 B1 * | 10/2002 | Karlsson et al. | 455/561 |
| 2003/0035490 A1 * | 2/2003 | Gollamudi | 375/267 |
| 2005/0130606 A1 * | 6/2005 | Wang et al. | 455/101 |
| 2006/0035605 A1 | 2/2006 | Ozluturk et al. | |
| 2009/0290563 A1 * | 11/2009 | Gu et al. | 370/338 |

FOREIGN PATENT DOCUMENTS

| | | |
|---|---|---|
| CN | 1190508 A | 8/1998 |
| CN | 1279568 A | 1/2001 |
| CN | 1728590 A | 2/2006 |
| CN | 101174865 A | 5/2008 |

OTHER PUBLICATIONS

International Search Report for Application No. PCT/CN2008/001069 dated Jun. 24, 2006.

* cited by examiner

*Primary Examiner* — Harry Liu
(74) *Attorney, Agent, or Firm* — Workman Nydegger

(57) ABSTRACT

A community antenna system in a closed loop mode and a method thereof are provided, the system includes two groups of pre-weighting processing modules, beamforming modules and antenna arrays connected in turn. The method includes the following processes: performing the pre-weighting processing on a transmission signal respectively according to the channel information corresponding to each of two antenna arrays; determining beamforming weight vectors according to two groups of steering vectors corresponding to the two antenna arrays, and performing weighting processing on the two pre-weighting processed transmission signals respectively to form two directional beams directed to the receiving antenna of a target mobile terminal; and transmitting the two directional beams via two antenna arrays with orthogonal polarization modes respectively.

9 Claims, 7 Drawing Sheets

COMMUNITY ANTENNA SYSTEM IN THE CLOSED LOOP MODE AND THE METHOD THEREOF

This application is a Continuation-in-Part of International Application No. PCT/CN2008/001069 filed May 30, 2008 which claims priority to Chinese Patent Application No. 200710099978.8 filed Jun. 1, 2007, both applications are incorporated herein by reference in their entireties.

FIELD OF THE INVENTION

The present invention relates to multi-antenna technologies, and in particular, to a community antenna system in a closed loop mode and a method thereof.

BACKGROUND OF THE INVENTION

The smart antenna technology has become one of the most attractive technologies in the mobile communications, and has been widely used in a Time Division-Synchronous Code Division Multiple Access (TD-SCDMA) system in a 3G mobile communication system.

The key technology of the smart antenna is the beamforming, which changes the directional diagram of an antenna array according to a steering vector of a signal and generates a spatially directional beam, thereby attaining the object of extracting a target signal and suppressing or eliminating interference. Because a smart antenna system performs the signal processing mainly depending on the strong dependency between antenna array elements to realize the beamforming, the space between the antenna array elements is required to be small; at present, the space is set as ½ wavelength in the TD-SCDMA systems. FIG. 11 is a schematic diagram of a smart antenna array in a TD-SCDMA system, where all the array elements of the smart antenna (it is hypothesized that there are N array elements, where N is a positive integer) employ the same polarization mode—vertical polarization, the space between each antenna array element is ½ wavelength, and N antenna array elements act on the beams coming from each direction to carry out the spatial filtering, thus aiming narrow beams with a high gain at the direction of a service user, and aiming null at the direction of the interference, so as to increase the output signal-to-interference ratio of the array, lower the interference in the system, and improve the anti-interference capability of the system.

In an Multiple-Input Multiple-Output (MIMO) or an Multiple-Input Single-Output (MISO), multiple antennas are used to suppress the channel fading or to increase the system capacity, so that multiplexing gain and space diversity gain may be provided to the system, where the spatial multiplexing technology may greatly increase the channel capacity, while the space diversity technology may increase the channel reliability and lower the channel bit error rate, thus it is regarded as the key technology of the physical layer in the systems such as a Long Term Evolution (LTE) and a WiMax. Because an MIMO/MISO system obtains the diversity gain mainly by using the independence of the space channel fading features of the different antennas, the space between the antenna array elements is required to be large, and theoretically, the space between the antenna array elements is required to be about 10 wavelengths.

Because different requirements are laid on the antenna dependency in a smart antenna system and an MIMO/MISO system, the large-scale reconstruction and modification of the antenna system may be faced during the future system evolution process. To solve this problem, and to integrate the smart antenna system and the MIMO/MISO system, in the prior art, either all of the antenna array elements in the original smart antenna system are simply divided into two groups, or the remote end antenna array elements are selected as the transmitting antennas in the specific situations.

In the solution of simply dividing all of the antenna array elements in the original smart antenna system into two groups, only a two-antenna system in a broad sense is formed from the original antenna array elements, but there still exists a very strong dependency between these two broad-sense antennas, and the corresponding diversity gain cannot be obtained. Moreover, in the solution of only selecting the remote end antenna array elements as the transmitting antennas, a different power amplifier from that of the original smart antenna system needs to be employed (since in order to guarantee the comparability, the sum of the powers of the two remote end antenna array elements is equal to the sum of the powers of all the antenna array elements in the original smart antenna system); and in such a solution, when the remote end antenna array elements are taken as the multiple input antennas of the MIMO/MISO system, the two remote end antenna array elements till have strong dependency theoretically, and cannot be further used for beamforming at the same time.

When a part of the antenna array elements (the remote end antenna array elements) in a smart antenna system is used for an MIMO/MISO system, other antenna array elements (the intermediate antenna array elements) should be set in off state; otherwise, all the antenna array elements will work according to the original smart antenna system. This relates to the allocation of the antennas and the public channel resources among different systems, thus causing the decrease of the system efficiency, thereby causing the decrease of the system throughput.

SUMMARY OF THE INVENTION

The embodiments of the invention provide a community antenna system in a closed loop mode and a method thereof, through systematically integrating the smart antenna technology with the MIMO/MISO technology, the terminals of different systems can be made to work simultaneously under the same antenna system, thereby seamless access can be realized.

An embodiment of the invention provides a community antenna system in a closed loop mode, when a mobile terminal has a single antenna, the system includes:

a first antenna array, in which antenna array elements have the same polarization mode, adapted to transmit a first directional beam;

a first pre-weighting processing module, adapted to perform the first pre-weighting processing on a transmission signal according to the first channel information corresponding to the first antenna array;

a first beamforming module, adapted to determine a beamforming weight vector according to a first group of steering vectors corresponding to the first antenna array, and perform a weighting processing on the first pre-weighting processed transmission signal to form the first directional beam directed to the receiving antenna of the target mobile terminal and transmit the first directional beam via the first antenna array;

a second antenna array, in which antenna array elements have the same polarization mode that is orthogonal to that of the first antenna array, adapted to transmit a second directional beam;

a second pre-weighting processing module, adapted to perform the second pre-weighting processing on a transmission signal according to the second channel information corresponding to the second antenna array; and a second beamforming module, adapted to determine a beamforming weight vector according to a second group of steering vectors corresponding to the second antenna array, and perform a weighting processing on the second pre-weighting processed transmission signal to form the second directional beam directed to the receiving antenna of the target mobile terminal and transmit the second directional beam via the second antenna array.

Wherein, the first pre-weighting processing module includes:

a first channel information unit, adapted to obtain the first channel information corresponding to the first antenna array according to a receiving signal or feedback information of the first antenna array; and a first pre-weighting processing unit, adapted to perform the first pre-weighting processing on the transmission signal according to the first channel information;

the second pre-weighting processing module includes:

a second channel information unit, adapted to obtain the second channel information corresponding to the second antenna array according to a receiving signal or feedback information of the second antenna array; and a second pre-weighting processing unit, adapted to perform the second pre-weighting processing on the transmission signal according to the second channel information.

The first beamforming module further includes:

a first steering vector unit, adapted to obtain the first group of steering vectors corresponding to the first antenna array according to a receiving signal of the first antenna array, wherein the first group of steering vectors are steering vector group corresponding to the antenna of the mobile terminal;

a first weight vector generating unit, adapted to generate a beamforming weight vector of the first antenna array according to the first group of steering vectors; and a first weighting unit, adapted to perform weighting processing on the first pre-weighting processed transmission signal according to the beamforming weight vector of the first antenna array to form the first directional beam directed to the receiving antenna of the target mobile terminal and transmit the first directional beam via the first antenna array;

the second beamforming module further includes:

a second steering vector unit, adapted to obtain the second group of steering vectors corresponding to the second antenna array according to a receiving signal of the second antenna array, wherein the second group of steering vectors are steering vector group corresponding to the antenna of the mobile terminal;

a second weight vector generating unit, adapted to generate a beamforming weight vector of the second antenna array according to the second group of steering vectors; and a second weighting unit, adapted to perform weighting processing on the second pre-weighting processed transmission signal according to the beamforming weight vector of the second antenna array to form the second directional beam directed to the receiving antenna of the target mobile terminal and transmit the second directional beam via the second antenna array.

An embodiment of the invention provides a method for community antenna in a closed loop mode, when a mobile terminal has a single antenna, the method includes:

performing the pre-weighting processing on a transmission signal respectively according to the channel information corresponding to each of two antenna arrays;

determining beamforming weight vectors according to two groups of steering vectors corresponding to the two antenna arrays, and performing weighting processing on the two pre-weighting processed transmission signals respectively to form two directional beams directed to the receiving antenna of a target mobile terminal; and transmitting the two directional beams via two antenna arrays with orthogonal polarization modes respectively.

Wherein, the process of performing the pre-weighting processing on a transmission signal respectively according to the channel information corresponding to each of two antenna arrays includes:

obtaining two channel information respectively according to a receiving signal or feedback information of the two antenna arrays; and performing the pre-weighting processing on the two transmission signals according to the two channel information to obtain the two pre-weighting processed transmission signals.

The process of determining beamforming weight vectors according to two groups of steering vectors corresponding to the two antenna arrays, and performing weighting processing on the two pre-weighting processed transmission signals respectively to form two directional beams directed to the receiving antenna of a target mobile terminal includes:

obtaining two groups of steering vectors according to the receiving signals of two antenna arrays, wherein each group of steering vectors include steering vectors corresponding to the antenna of the mobile terminal; generating the beamforming weight vectors of the two antenna arrays according to the two groups of steering vectors; and performing the weighting processing on the two pre-weighting processed transmission signals according to the beamforming weight vectors of the two antenna arrays to form two directional beams directed to the receiving antenna of the target mobile terminal.

An embodiment of the invention further provides a community antenna system in a closed loop mode, when a mobile terminal has multiple antennas, the system includes:

a downlink channel matrix processing module, adapted to perform the pre-weighting processing on transmission signals according to a first group of downlink channel information corresponding to a first antenna array and a second group of downlink channel information corresponding to a second antenna array;

a first beamforming module, adapted to perform the weighting processing on the pre-weighting processed transmission signal according to a downlink beamforming weight vector generated via the first cluster of steering vectors corresponding to a first antenna array to form a first directional beam directed to the target mobile terminal and transmit the first directional beam via the first antenna array;

a second beamforming module, adapted to perform the weighting processing on the pre-weighting processed transmission signal according to a downlink beamforming weight vector generated via the second cluster of steering vectors corresponding to a second antenna array to form a second directional beam directed to the target mobile terminal and transmit the second directional beam via the second antenna array;

a first antenna array, in which antenna array elements have the same polarization mode, adapted to transmit the first directional beam; and a second antenna array, in which antenna array elements have the same polarization mode that is orthogonal to that of the first antenna array, adapted to transmit the second directional beam.

Wherein, the downlink channel matrix processing module includes:

a first group channel information unit, adapted to obtain the first group of downlink channel information according to a receiving signal or feedback information of the first antenna array, wherein the first group of downlink channel information includes M downlink channel information corresponding to M receiving antennas of a target mobile terminal, and M is a positive integer;

a second group channel information unit, adapted to obtain the second group of downlink channel information according to a receiving signal or feedback information of the second antenna array, wherein the second group of downlink channel information includes M downlink channel information corresponding to M receiving antennas of a target mobile terminal;

a downlink channel matrix processing unit, adapted to obtain a downlink channel matrix according to the first group of downlink channel information and the second group of downlink channel information, and perform singular value decomposition on the downlink channel matrix;

a first pre-weighting processing unit, adapted to select a first element of an input vector corresponding to a specific singular value according to the singular value decomposition result of the downlink channel matrix processing unit to perform the pre-weighting processing on a transmission signal, and transmit the pre-weighting processed transmission signal to the first beamforming module; and a second pre-weighting processing unit, adapted to select a second element of an input vector corresponding to a specific singular value according to the singular value decomposition result of the downlink channel matrix processing unit to perform the pre-weighting processing on a transmission signal, and transmit the pre-weighting processed transmission signal to the second beamforming module.

the first beamforming module includes:

a first cluster steering vector unit, adapted to obtain the first cluster of steering vectors according to a receiving signal of the first antenna array, wherein the first cluster of steering vectors include M steering vector groups corresponding to M antennas of the mobile terminal, and M is a positive integer;

a first weight vector generating unit, adapted to generate, according to the first cluster of steering vectors, a downlink beamforming weight vector of the first antenna array corresponding to the M receiving antennas of the target mobile terminal; and a first weighting unit, adapted to perform the weighting processing on the pre-weighting processed transmission signal from the downlink channel matrix processing module according to the downlink beamforming weight vector of the first antenna array corresponding to the M receiving antennas of the target mobile terminal, and transmit the first directional beam via the first antenna array, wherein the first directional beam includes downlink directional beams directed to the M receiving antennas of the target mobile terminal respectively;

the second beamforming module includes:

a second cluster steering vector unit, adapted to obtain the second cluster of steering vectors according to a receiving signal of the second antenna array, wherein the second cluster of steering vectors include M steering vector groups corresponding to the M antennas of the mobile terminal, and M is a positive integer;

a second weight vector generating unit, adapted to generate, according to the second cluster of steering vectors, a downlink beamforming weight vector of the second antenna array corresponding to the M receiving antennas of the target mobile terminal; and a second weighting unit, adapted to perform the weighting processing on the pre-weighting processed transmission signal from the downlink channel matrix processing module according to the downlink beamforming weight vector of the second antenna array corresponding to the M receiving antennas of the target mobile terminal, and transmit the second directional beam via the second antenna array, wherein the second directional beam includes downlink directional beams directed to the M receiving antennas of the target mobile terminal respectively.

An embodiment of the invention further provides a method for community antenna in a closed loop mode, when a mobile terminal has multiple antennas, the method includes:

performing the pre-weighting processing on a transmission signal according to two groups of downlink channel information corresponding to two antenna arrays;

determining two downlink beamforming weight vectors according to two clusters of steering vectors corresponding to the two antenna arrays, and performing the weighting processing on the pre-weighting processed transmission signal to form two directional beams; and transmitting the two directional beams via two antenna arrays with orthogonal polarization modes.

Wherein, each group of the downlink channel information includes M downlink channel information corresponding to M receiving antennas of a target mobile terminal, and M is a positive integer.

Each cluster of steering vectors include M steering vector groups corresponding to M antennas of the mobile terminal.

Each of the two directional beams includes downlink directional beams directed to M receiving antennas of the target mobile terminal respectively.

The process of performing the pre-weighting processing on a transmission signal according to two groups of downlink channel information corresponding to two antenna arrays includes:

obtaining two groups of downlink channel information according to receiving signals or feedback information of the two antenna arrays;

obtaining a downlink channel matrix according to the two groups of downlink channel information, and performing singular value decomposition on the downlink channel matrix; and selecting two elements of an input vector corresponding to a specific singular value according to the singular value decomposition result of the downlink channel matrix to performing the pre-weighting processing on the transmission signals respectively, and obtaining two pre-weighting processed transmission signals.

The process of determining two downlink beamforming weight vectors according to two clusters of steering vectors corresponding to the two antenna arrays and performing the weighting processing on the pre-weighting processed transmission signal to form two directional beams includes:

obtaining two clusters of steering vectors according to receiving signals of the two antenna arrays;

generating the downlink beamforming weight vectors of the two antenna arrays corresponding to M receiving antennas of the target mobile terminal according to the two clusters of steering vectors; and performing the weighting processing on the two pre-weighting processed transmission signals respectively according to the downlink beamforming weight vectors of the two antenna arrays to form the two directional beams.

The invention proposes a community antenna system in a closed loop mode when a mobile terminal has a single antenna, and a method thereof. First two broad-sense transmitting antennas are formed by a first antenna array and a second antenna array; because the polarization modes of the two antenna arrays are orthogonal to each other, these two broad-sense antennas are independent from each other, so that a broad-sense MISO system (2×1 MISO system) may be formed. Under such an antenna array structure, the two antenna arrays may respectively obtain the steering vectors and the channel information corresponding to the two antenna arrays according to the receiving signals with independent fading that are received, the pre-weighting processing may be performed on the transmission signals on the broad-sense antennas by using each channel information, and the weighting processing may be performed on the pre-weighting processed transmission signal by using a beamforming weight vector determined via the respective steering vectors, and two directional beams directed to the receiving antenna of the target mobile terminal may be formed after transmitting the two weighting processed transmission signals via the two broad-sense antennas respectively, so that the sufficient transmission diversity gain and array gain may be obtained, and a good performance may be obtained.

The invention proposes another community antenna system in a closed loop mode when a mobile terminal has multiple antennas, and a method thereof. First, two broad-sense transmitting antennas are formed by a first antenna array and a second antenna array; because the polarization modes of the two antenna arrays are orthogonal to each other, these two broad-sense antennas are independent from each other, so that a broad-sense MIMO system (2×M MIMO system) is formed. Under such an antenna array structure, each antenna array may obtain a group of downlink channel information according to its receiving signal or feedback information, and a 2×M downlink channel matrix may be obtained by using the two groups of downlink channel information, and a downlink beamforming weight vector may be determined by using a cluster of steering vectors corresponding to each antenna array after performing singular value decomposition on the downlink channel matrix, the weighting processing may be performed on the pre-weighting processed transmission signal to form two directional beams directed to M receiving antennas of the target mobile terminal, and the two directional beams may be transmitted via the two antenna arrays, so that a full transmission diversity gain and array gain may be obtained, and a good performance may be obtained.

In the community antenna system in the closed loop mode and the method thereof according to the embodiments of the invention, not only the basic structure of the smart antenna array elements can be kept, but also the diversity gains and the array gains obtained by the MIMO/MISO technology can be attained, so that the requirement of integrating the smart antenna technology with the MIMO/MISO technology can be well met, and the terminals in an on-going commercial TD-SCDMA system and the terminals in a future system using the MIMO/MISO technology may simultaneously work in the system and the method according to the embodiments of the invention, thereby realizing seamless access. Because no allocation and use of antenna array elements are concerned, the design of terminals may be unified more easily; moreover, the evolution of the future antenna system may be made much smoother, thus the large-scale reconstruction and modification that may appear during the future system evolution process can be avoided.

DETAILED DESCRIPTION OF THE EMBODIMENTS

Embodiment 1

Figure 1:
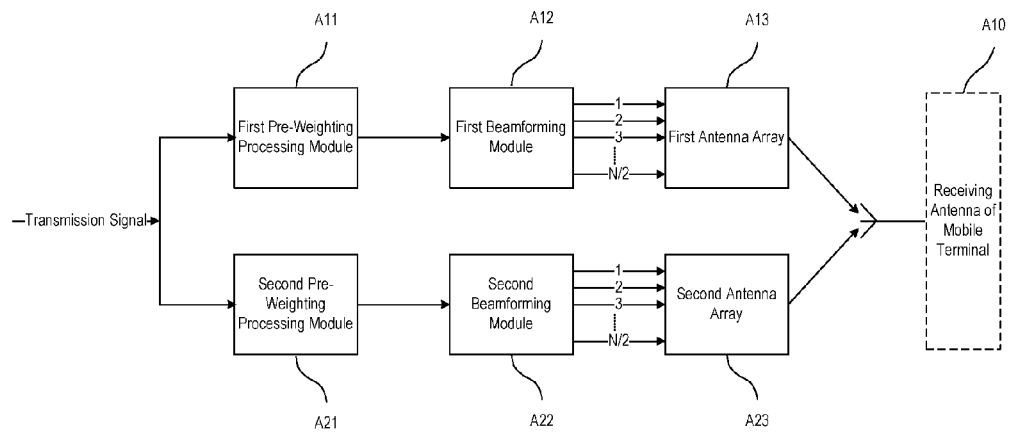
FIG. 1 is a structural representation of a community antenna system in a closed loop mode when a mobile terminal has a single antenna according to Embodiment 1 of the invention.

FIG. 1 is a structural representation of a community antenna system in a closed loop mode when a mobile terminal has a single antenna according to Embodiment 1 of the invention. As shown in FIG. 1, the community antenna system in the closed loop mode is consisted of a first subsystem and a second subsystem that transmit directional beams to a receiving antenna A10 of the mobile terminal. The first subsystem includes a first pre-weighting processing module A11, a first beamforming module A12 and a first antenna array A13 connected in turn; the first pre-weighting processing module A11 is adapted to perform the first pre-weighting processing on a transmission signal according to the first channel information corresponding to the first antenna array A13; the first beamforming module A12 is adapted to determine a beamforming weight vector according to the first group of steering vectors corresponding to the first antenna array A13, and perform the weighting processing on the first pre-weighting processed transmission signal to form a first directional beam directed to the receiving antenna A10 of the target mobile terminal; the first antenna array A13 is adapted to transmit the first directional beam in a first polarization mode. The second subsystem includes a second pre-weighting processing module A21, a second beamforming module A22 and a second antenna array A23 connected in turn; the second pre-weighting processing module A21 is adapted to perform the second pre-weighting processing on a transmission signal according to the second channel information corresponding to the second antenna array A23; the second beamforming module A22 is adapted to determine a beamforming weight vector according to a second group of steering vectors corresponding to the second antenna array A23, and perform the weighting processing on the second pre-weighting processed transmission signal to form a second directional beam directed to the receiving antenna A10 of the target mobile terminal; the second antenna array A23 is adapted to transmit the second directional beam in a second polarization mode. Wherein, each antenna array element in the first antenna array A13 has the same first polarization mode, each antenna array element in the second antenna array A23 has the same second polarization mode, and the first polarization mode and the second polarization mode are orthogonal to each other.

A new antenna integration solution is put forward in Embodiment 1 of the invention, where all the array elements of the original smart antenna system are divided into two groups, the polarization modes of the antenna array elements in each group are the same, the space between the antenna array elements is kept as the space required in the original smart antenna system, and the polarization modes of the antenna array elements in different groups are orthogonal, so that these two groups of antennas form a two-antenna system in a broad sense, and the space fading features of these two broad-sense antennas are mutually independent, thus the requirement on the independence of antennas in an MIMO/MISO system can be met on the basis that the basic structure of the original smart antenna system is kept. Because the antenna array elements in each group meet the requirement of the smart antenna system, smart antenna technology may be employed by the antennas in each group. The MIMO/MISO systems may be divided into closed-loop MIMO/MISO systems and open-loop MIMO/MISO systems according to whether the transmitting end has the channel information. The technical solution of Embodiment 1 of the invention is applied in the closed-loop MIMO/MISO; in the case that the channel information is effectively used, not only all the diversity gains may be obtained, but also the array gains may be obtained. Specifically, in Embodiment 1 of the invention, first two broad-sense transmitting antennas are formed by the first antenna array and the second antenna array; because the polarization modes of the two antenna arrays are orthogonal to each other, these two broad-sense antennas are independent from each other, and two beams with relatively independent fading features may be formed by the two antenna arrays according to their respective steering vector, so that a broad-sense MISO system (2×1 MISO system) may be formed. Under such an antenna array structure, the two antenna arrays may respectively obtain the steering vectors and the channel information corresponding to the two antenna arrays according to the receiving signals with independent fading that are received, the pre-weighting processing may be performed on the transmission signals on the broad-sense antennas by using each channel information, and the weighting processing may be performed on the pre-weighting processed transmission signal by using a beamforming weight vector determined via the respective steering vectors, and two directional beams directed to the receiving antenna of the target mobile terminal may be formed after transmitting the two weighting processed transmission signals via the two broad-sense antennas respectively, so that the sufficient transmission diversity gain and array gain may be obtained, and a good performance may be obtained. As a community antenna system for a smart antenna system and an MIMO/MISO system, the community antenna system in the closed loop mode according to Embodiment 1 of the invention can not only keep the basic structure of the smart antenna array elements, but also obtain the diversity gains and array gains that can be attained via the MISO technology, so that the requirement on the integration of the smart antenna technology and the MISO technology may be well met, and the terminals in an on-going commercial TD-SCDMA system and the terminals in a future system using the MISO technology may simultaneously work in the system according to Embodiment 1 of the invention, thereby realizing seamless access; moreover, the evolution of the future antenna system may be made much smoother, thus the large-scale reconstruction and modification that may appear during the future system evolution process can be avoided.

Additionally, the polarization modes of the first antenna array and the second antenna array are orthogonal to each other, so that the two broad-sense antennas are independent, and the equivalent channels, which are formed by each group of antenna array elements according to the beamforming weight vector generated based on the steering vectors between the group of antenna array elements and the terminal antenna after performing the weighting on a signal, are independent from each other; if the transmitting end simply weights and transmits the signals by directly using the beamforming weight vectors generated based on the steering vectors corresponding to each antenna array, the signals at the receiving end after being transferred via the two equivalent channels will be incoherent superposition, thus the object of effectively enhancing the signal-to-interference ratio of a receiving signal and improving the channel capacity cannot be attained. If the independence of the antenna array is considered on the basis that beamforming processing is performed on the signal, for example, a certain pre-weighting processing is performed before or after a signal is weighted by using a beamforming weight vector, for example, operations such as phase rotation, or a uniform downlink beamforming weight vector is formed by combining these operations and the independent beamforming processing of each antenna array, the object of effectively enhancing the signal-to-interference ratio of a receiving signal and improving the channel capacity may be attained. Herein, the case that the pre-weighting processing is performed before a signal is weighted by using a beamforming weight vector is taken as an example.

Figure 2:
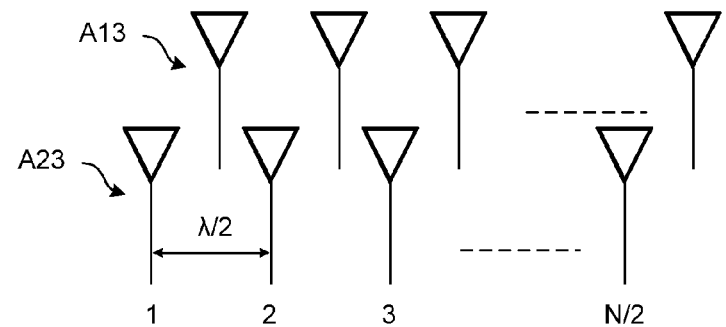
FIG. 2 is a schematic diagram of an antenna array according to Embodiment 1 of the invention.

FIG. 2 is a schematic diagram of an antenna array according to Embodiment 1 of the invention. As directed to N array elements in a smart antenna array of a prior art TD-SCDMA system, where N is a positive integer and the space between each antenna array element is less than or equal to $\lambda/2$ ($\lambda$, represents the wavelength), this embodiment proposes a technical solution of forming two broad-sense transmitting antennas on the basis of a bipolarized antenna. Specifically, in this embodiment, N array elements in the antenna array are equally divided into two groups: the first antenna array A13 and the second antenna array A23; where each antenna array has N/2 antenna array elements, and the space between adjacent antenna array elements in each antenna array is less than or equal to $\lambda/2$, all the antenna array elements in each antenna array employ the same polarization mode, but the polarization modes of the first antenna array A13 and the second antenna array A23 are orthogonal to each other. For example, the first antenna array A13 may be a −45° polarized antenna array, and the second antenna array A23 may be a +45° polarized antenna array. Thereby, the −45° polarized antenna array and the +45° polarized antenna array form a bipolarized antenna, and two broad-sense transmitting antennas are formed based on the bipolarized antenna; moreover, these two broad-sense antennas are independent from each other, thus they have an MISO form.

Figure 3A:
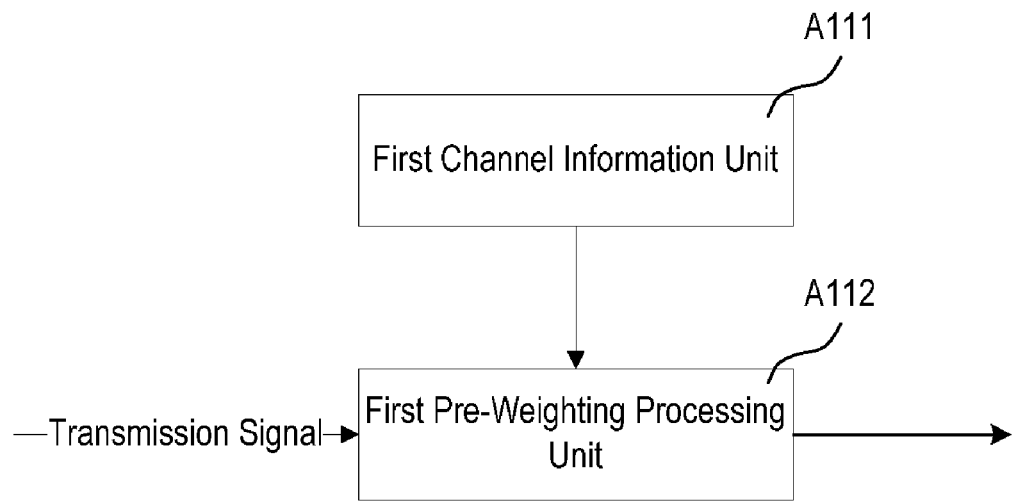
FIG. 3a is a structural representation of a first pre-weighting processing module according to Embodiment 1 of the invention.
Figure 3B:
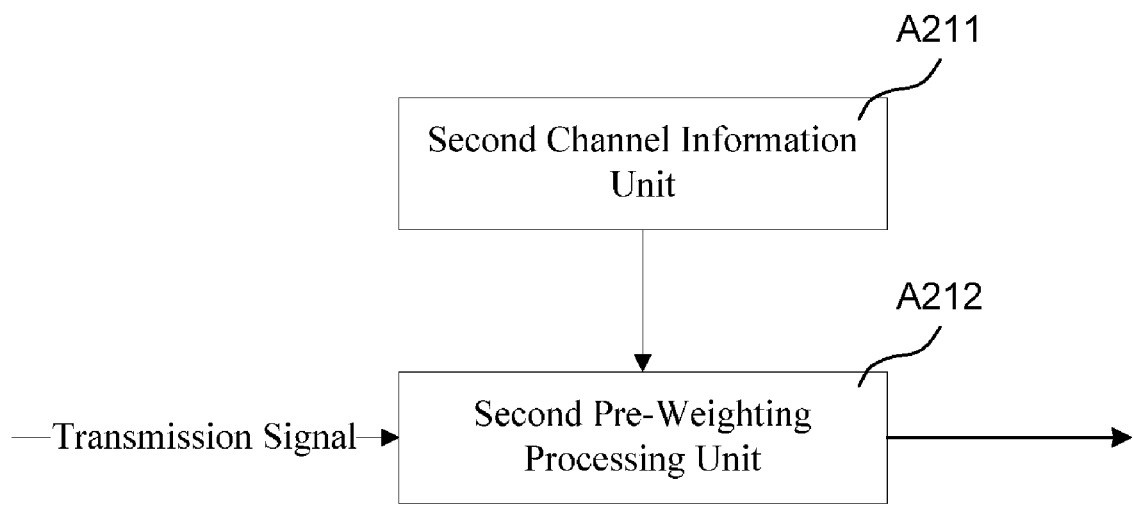
FIG. 3b is a structural representation of a second pre-weighting processing module according to Embodiment 1 of the invention.

FIG. 3a is a structural representation of the first pre-weighting processing module A11 according to Embodiment 1 of the invention, and FIG. 3b is a structural representation of the second pre-weighting processing module A21 according to Embodiment 1 of the invention. As shown in FIG. 3a, the first pre-weighting processing module A11 includes a first channel information unit A111 and a first pre-weighting processing unit A112; the first channel information unit A111 is adapted to obtain the first channel information corresponding to the first antenna array A13 according to a receiving signal or feedback information of the first antenna array A13 and transmit the first channel information to the first pre-weighting processing unit A112; the first pre-weighting processing unit A112 is adapted to perform the pre-weighting processing on the transmission signal according to the first channel information and transmit the processing result to the first beamforming module A12. As shown in FIG. 3b, the second pre-weighting processing module A21 includes a second channel information unit A211 and a second pre-weighting processing unit A212; the second channel information unit A211 is adapted to obtain the second channel information corresponding to the second antenna array A23 according to a receiving signal or feedback information of the second antenna array A23 and transmit the second channel information to the second pre-weighting processing unit A212; the second pre-weighting processing unit A212 is adapted to perform the pre-weighting processing on the transmission signal according to the second channel information and transmit the processing result to the second beamforming module A22.

In the technical solutions shown in FIG. 3a and FIG. 3b, the pre-weighting processing may employ maximum ratio combining (MRC) transmission, and may also employ equal gain combining or selective combining. Preferably, MRC transmission is employed in this embodiment; that is, the first pre-weighting processing unit A112 is a first MRC transmission unit that performs the MRC transmission on the transmission signal, the second pre-weighting processing unit A212 is a second MRC transmission unit that performs the MRC transmission on the transmission signal, and the MRC transmission is performed on the transmission signal according to the respective channel information, and the pre-weighting processed transmission signals are transmitted to the beamforming modules respectively, so that the sufficient transmission diversity gain and array gain may be obtained. The MRC transmission refers to controlling the weight of each combined branch to make them superposed at the same phase on the receiving end. Specifically, all the branches may be used; that is, the same signal may be transmitted via the two antenna arrays, and the pre-weighting factor of the signal in each antenna array is determined by the fading information of a channel experienced by two downlink beams, so that the signals received by the receiving antenna of the mobile terminal from the two antenna arrays will have the same phase or will be coherently combined.

Figure 4A:
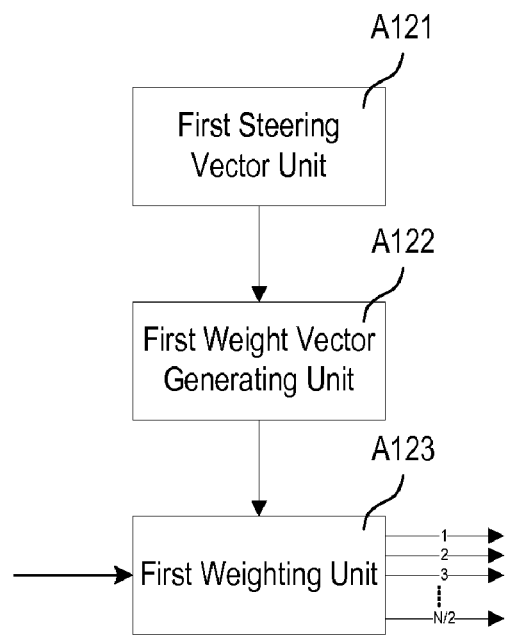
FIG. 4a is a structural representation of a first beamforming module according to Embodiment 1 of the invention.
Figure 4B:
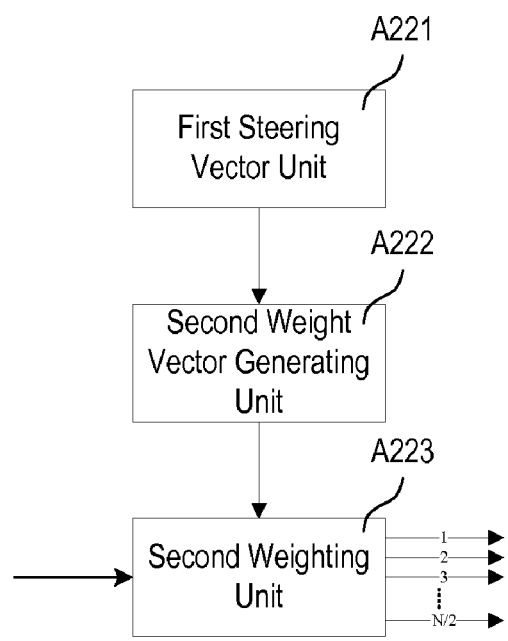
FIG. 4b is a structural representation of a second beamforming module according to Embodiment 1 of the invention.

FIG. 4a is a structural representation of the first beamforming module according to this embodiment, and FIG. 4b is a structural representation of the second beamforming module according to this embodiment. As shown in FIG. 4a, the first beamforming module A12 includes a first steering vector unit A121, a first weight vector generating unit A122 and a first weighting unit A123; the first weighting unit A123 is respectively connected with the first pre-weighting processing unit A112 of the first pre-weighting processing module A11 and the first antenna array A13. The first steering vector unit A121 is adapted to obtain the first group of steering vectors corresponding to the first antenna array A13 according to the receiving signal of the first antenna array A13, where the first group of steering vectors are steering vector group corresponding to the antenna of the mobile terminal; the first weight vector generating unit A122 is adapted to generate a beamforming weight vector of the first antenna array according to the first group of steering vectors; and the first weighting unit A123 is adapted to receive a pre-weighting processed transmission signal from the first pre-weighting processing unit A112, perform the weighting processing on the first pre-weighting processed transmission signal according to the beamforming weight vector of the first antenna array, transmit N/2 output signals to the first antenna array A13, and transmit the first directional beam directed to the receiving antenna A10 of the target mobile terminal via the first antenna array A13.

As shown in FIG. 4b, the second beamforming module A22 includes a second steering vector unit A221, a second weight vector generating unit A222 and a second weighting unit A223; the second weighting unit A223 is respectively connected with the second pre-weighting processing unit A212 of the second pre-weighting processing module A21 and the second antenna array A23. The second steering vector unit A221 is adapted to obtain the second group of steering vectors corresponding to the second antenna array A23 according to the receiving signal of the second antenna array A23, where the second group of steering vectors are steering vector group corresponding to the antenna of the mobile terminal; the second weight vector generating unit A222 is adapted to generate a beamforming weight vector of the second antenna array according to the second group of steering vectors; and the second weighting unit A223 is adapted to receive the pre-weighting processed transmission signal from the second pre-weighting processing unit A212, perform the weighting processing on the second pre-weighting processed transmission signal according to the beamforming weight vector of the second antenna array, transmit N/2 output signals to the second antenna array A23, and transmit the second directional beam directed to the receiving antenna A10 of the target mobile terminal via the second antenna array A23.

Figure 5:
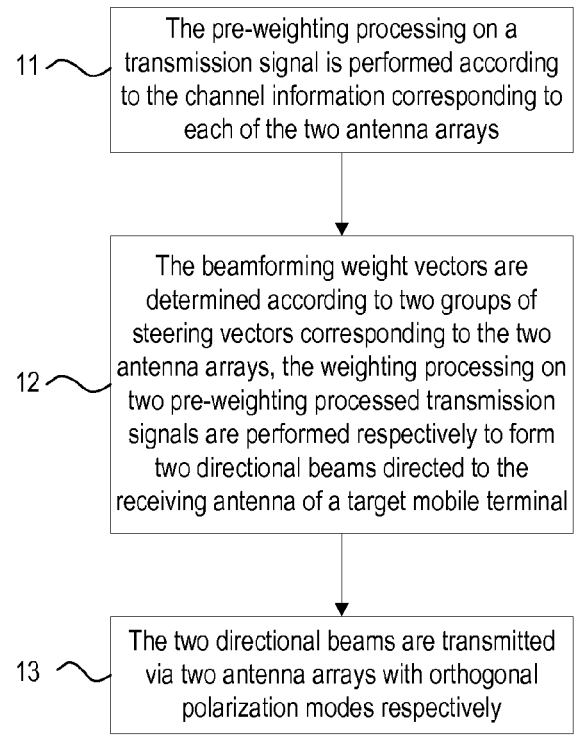
FIG. 5 is a flow chart of a method for community antenna in a closed loop mode when a mobile terminal has a single antenna according to Embodiment 1 of the invention.

FIG. 5 is a flow chart of a method for community antenna in a closed loop mode when a mobile terminal has a single antenna according to Embodiment 1 of the invention, the method includes:

Process 11: the pre-weighting processing on a transmission signal is performed according to the channel information corresponding to each of the two antenna arrays.

Process 12: the beamforming weight vectors are determined according to two groups of steering vectors corresponding to the two antenna arrays, the weighting processing on two pre-weighting processed transmission signals are performed respectively to form two directional beams directed to the receiving antenna of a target mobile terminal.

Process 13: the two directional beams are transmitted via two antenna arrays with orthogonal polarization modes respectively.

The method for community antenna in the closed loop mode when the mobile terminal has a single antenna according to Embodiment 1 of the invention is realized on the basis of two broad-sense transmitting antennas formed by the first antenna array and the second antenna array. The first antenna array and the second antenna array may respectively include N/2 antenna array elements with the same polarization mode, and the space between each antenna array element is less than or equal to $\lambda/2$, the polarization modes of the first antenna array and the second antenna array are orthogonal to each other, thus these two broad-sense antennas are independent from each other, and the two antenna arrays may form two beams with relatively independent fading features according to their respective steering vector, so that a broad-sense MISO system (2×1 MISO system) may be formed. Under the structure of the two broad-sense transmitting antennas formed by the first antenna array and the second antenna array according to Embodiment 1 of the invention, the first antenna array may obtain the first channel information corresponding to the first antenna array according to a receiving signal or feedback information with an independent fading that is received, and obtain the first group of steering vectors corresponding to the first antenna array according to the receiving signal; the second antenna array may obtain the second channel information corresponding to the second antenna array according to a receiving signal or feedback information with an independent fading that is received, and obtain the second group of steering vectors corresponding to the second antenna array according to the receiving signal. Based on this, the first pre-weighting processing is performed on a transmission signal according to the first channel information, a beamforming weight vector is determined according to the first group of steering vectors, and the weighting processing is performed on the first pre-weighting processed transmission signal to form a first directional beam directed to the receiving antenna of a target mobile terminal, and the first directional beam is transmitted via the first antenna array. Moreover, the second pre-weighting processing is performed on a transmission signal according to the second channel information, a beamforming weight vector is determined according to the second group of steering vectors, and the weighting processing is performed on the second pre-weighting processed transmission signal to form a second directional beam directed to the receiving antenna of the target mobile terminal, and the second directional beam is transmitted via the second antenna array. In the above processing procedure, the full transmission diversity gain and the array gain may be obtained, and a good performance may be obtained. As a method for community antenna of smart antennas system and an MIMO/MISO system, the method for community antenna in the closed loop mode according to Embodiment 1 of the invention can not only keep the basic structure of the smart antenna array elements, but also obtain the diversity gain and array gain that can be attained via the MISO technology, so that the requirement on the integration of the smart antenna technology and the MISO technology may be well met, and the terminals in an on-going commercial TD-SCDMA system and the terminals in a future system using the MISO technology may simultaneously work under the method according to Embodiment 1 of the invention, thereby realizing seamless access; moreover, the evolution of the future antenna system may be made much smoother, thus the large-scale reconstruction and modification that may appear during the future system evolution process can be avoided.

In the technical solution shown in FIG. 5, Process 11 includes:

Process 111: two channel information is obtained according to a receiving signal or feedback information of two antenna arrays;

Process 112: the pre-weighting processing is performed on the transmission signals respectively according to the two channel information to obtain two pre-weighting processed transmission signals.

The two channel information obtained according to a receiving signal or feedback information of the two antenna arrays includes the first channel information corresponding to the first antenna array and the second channel information corresponding to the second antenna array. The pre-weighting processing is performed on a transmission signal according to the first channel information to obtain a first pre-weighting processed transmission signal; and the pre-weighting processing is performed on a transmission signal according to the second channel information to obtain a second pre-weighting processed transmission signal.

In the technical solution shown in FIG. 5, Process 12 includes:

Process 121: two groups of steering vectors are obtained according to the receiving signals of the two antenna arrays;

Process 122: the beamforming weight vectors of the two antenna arrays are generated respectively according to the two groups of steering vectors; and Process 123: the weighting processing is performed on the two pre-weighting processed transmission signals respectively according to the beamforming weight vectors of the two antenna arrays to form two directional beams directed to the receiving antenna of the target mobile terminal.

The two groups of steering vectors obtained according to the receiving signals of the two antenna arrays include the first group of steering vectors corresponding to the first antenna array and the second group of steering vectors corresponding to the second antenna array, where the first group of steering vectors are steering vector group corresponding to the antenna of the mobile terminal, and the second group of steering vectors are steering vector group corresponding to the antenna of the mobile terminal. A beamforming weight vector of the first antenna array may be generated according to the first group of steering vectors, and the first directional beam directed to the receiving antenna of the target mobile terminal may be formed by performing the weighting processing on the first pre-weighting processed transmission signal according to the beamforming weight vector of the first antenna array, and the first directional beam is transmitted via the first antenna array. A beamforming weight vector of the second antenna array may be generated according to the second group of steering vectors, and a second directional beam directed to the receiving antenna of the target mobile terminal may be formed by performing the weighting processing on the second pre-weighting processed transmission signal according to the beamforming weight vector of the second antenna array, and the second directional beam is transmitted via the second antenna array.

Based on the above technical solution, the pre-weighting processing may employ the MRC transmission, and may also employ equal gain combining or selective combining. Preferably, the MRC transmission is employed in this embodiment. That is, the MRC transmission is performed on the transmission signal according to the respective channel information, and the pre-weighting processed transmission signal is transmitted, so that a full transmission diversity gain and array gain may be obtained. Specifically, the MRC transmission processing includes:

the fading information of a channel experienced by a downlink beam is obtained according to the antenna array; and the pre-weighting factor of each antenna array element is determined.

Embodiment 2

Figure 6:
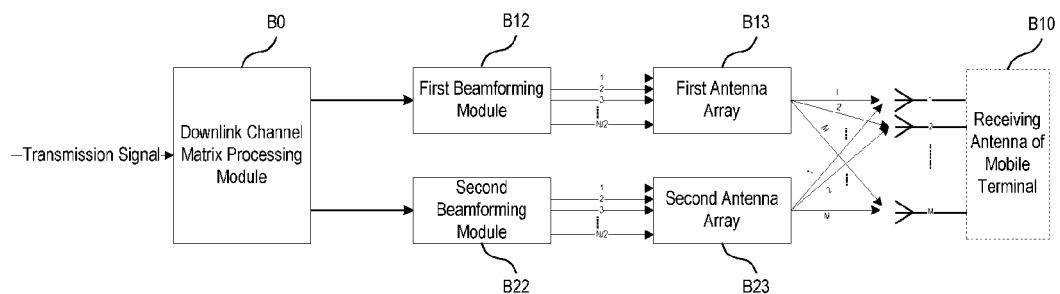
FIG. 6 is a structural representation of a community antenna system in a closed loop mode when a mobile terminal has multiple antennas according to Embodiment 2 of the invention.

FIG. 6 is a structural representation of a community antenna system in a closed loop mode when a mobile terminal has multiple antennas according to Embodiment 2 of the invention. As shown in FIG. 6, the community antenna system in the closed loop mode includes a downlink channel matrix processing module B0, a first beamforming module B12 that transmits a downlink directional beam to M receiving antennas B10 of a target mobile terminal via a first antenna array B13, and a second beamforming module B22 that transmits a downlink directional beam to M receiving antennas B10 of the target mobile terminal via the second antenna array B23. Where, the downlink channel matrix processing module B0 is adapted to perform the pre-weighting processing on a transmission signal according to the first group of downlink channel information corresponding to the first antenna array B13 and the second group of downlink channel information corresponding to the second antenna array B23; the first beamforming module B12 is adapted to determine a downlink beamforming weight vector according to the first cluster of steering vectors corresponding to the first antenna array B13, perform the weighting processing on the transmission signal pre-weighting processed via the downlink channel matrix processing module B0 to form a first directional beam directed to the M receiving antennas B10 of the target mobile terminal; the first antenna array B13 is adapted to transmit the first directional beam in a first polarization mode; the second beamforming module B22 is adapted to determine a downlink beamforming weight vector according to a second cluster of steering vectors corresponding to the second antenna array B23, perform the weighting processing on the transmission signal pre-weighting processed via the downlink channel matrix processing module B0 to form a second directional beam directed to the M receiving antennas B10 of the target mobile terminal; the second antenna array B23 is adapted to transmit the second directional beam in a second polarization mode. Where, each antenna array element in the first antenna array B13 has the same first polarization mode, each antenna array element in the second antenna array B23 has the same second polarization mode, and the first polarization mode and the second polarization mode are orthogonal to each other.

In the community antenna system in the closed loop mode when the mobile terminal has multiple antennas according to Embodiment 2 of the invention, first, two broad-sense transmitting antennas are formed by the first antenna array and the second antenna array. Because the polarization modes of the two antenna arrays are orthogonal to each other, these two broad-sense antennas are independent from each other. Each antenna array may form a directional beam according to a cluster of steering vectors corresponding thereto, so that a broad-sense MIMO system (2×M MIMO system) may be formed. Under such an antenna array structure, each antenna array may obtain a group of downlink channel information according to its receiving signal or feedback information, and a 2×M downlink channel matrix may be obtained by using the two groups of downlink channel information, the beamforming is performed on the pre-weighting processed transmission signal by using a cluster of steering vectors corresponding to each antenna array after performing the singular value decomposition processing on the downlink channel matrix to form two directional beams directed to the M receiving antennas of the target mobile terminal, and the two directional beams are transmitted via the two broad-sense antennas respectively, so that a large transmission diversity gain and array gain may be obtained, and a good performance may be obtained. As a community antenna system for a smart antenna system and an MIMO/MISO system, the community antenna system in the closed loop mode according to Embodiment 2 of the invention can not only keep the basic structure of the smart antenna array elements, but also obtain the diversity gains and array gains that can be attained via the MIMO technology, so that the requirement on the integration of the smart antenna technology and the MIMO technology may be well met, and the terminals in an on-going commercial TD-SCDMA system and the terminals in a future system using the MIMO technology may simultaneously work in the system according to Embodiment 2 of the invention, thereby realizing seamless access; moreover, the evolution of the future antenna system may be made much smoother, thus the large-scale reconstruction and modification that may appear during the future system evolution process can be avoided.

Additionally, the polarization modes of the first antenna array and the second antenna array are orthogonal to each other, so that the two broad-sense antennas are independent from each other, and the equivalent channels, which are formed by each group of antenna array elements according to the downlink beamforming weight vector generated based on the steering vectors between the group of antenna array elements and the terminal antenna after performing the weighting on a signal, are independent from each other; if the transmitting end simply weights and transmits the signals by directly using the downlink beamforming weight vectors generated based on the steering vectors corresponding to each antenna array, it will be difficult to maximize the channel capacity. If, on the basis that the beamforming processing is performed on a signal, the downlink channel information corresponding to the two antenna arrays are fully considered, a suitable weight vector or matrix is selected to perform further pre-weighting processing before or after performing the weighting on a signal according to the beamforming weight vector, or the weight vector or the matrix is combined with the independent beamforming processing on each antenna array to form a uniform downlink beamforming weight vector, the channel capacity will be improved effectively. Herein, the case that pre-weighting processing is performed by using an eigenvector before a signal is weighted by using a downlink beamforming weight vector is taken as an example.

Figure 7:
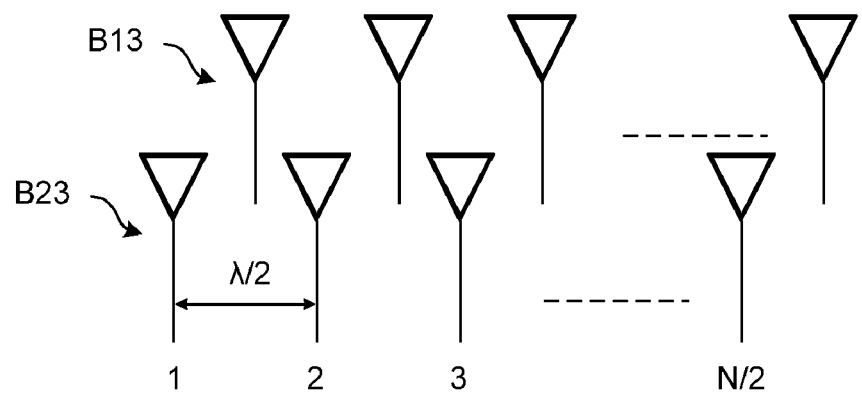
FIG. 7 is a schematic diagram of an antenna array according to Embodiment 2 of the invention.

FIG. 7 is a schematic diagram of an antenna array according to Embodiment 2 of the invention. As directed to N array elements in a smart antenna array of a prior art TD-SCDMA system, where N is a positive integer and the space between each antenna array element is less than or equal to λ/2, this embodiment proposes a technical solution of forming two broad-sense transmitting antennas on the basis of a bipolarized antenna. Specifically, in this embodiment, N array elements in the antenna array are equally divided into two groups: the first antenna array B13 and the second antenna array B23, where each antenna array has N/2 antenna array elements, and the space between adjacent antenna array elements in each antenna array is less than or equal to λ/2(λ, represents the wavelength), all the antenna array elements in each antenna array employ the same polarization mode, but the polarization modes of the first antenna array B13 and the second antenna array B23 are orthogonal to each other. For example, the first antenna array B13 may be a −45° polarized antenna array, and the second antenna array B23 may be a +45° polarized antenna array. Thereby, the −45° polarized antenna array and the +45° polarized antenna array form a bipolarized antenna, and two broad-sense transmitting antennas are formed based on the bipolarized antenna; moreover, these two broad-sense antennas are independent from each other, thus they have an MIMO form.

The technical solution according to Embodiment 2 of the invention will now be illustrated via a mobile terminal with two receiving antennas.

Figure 8:
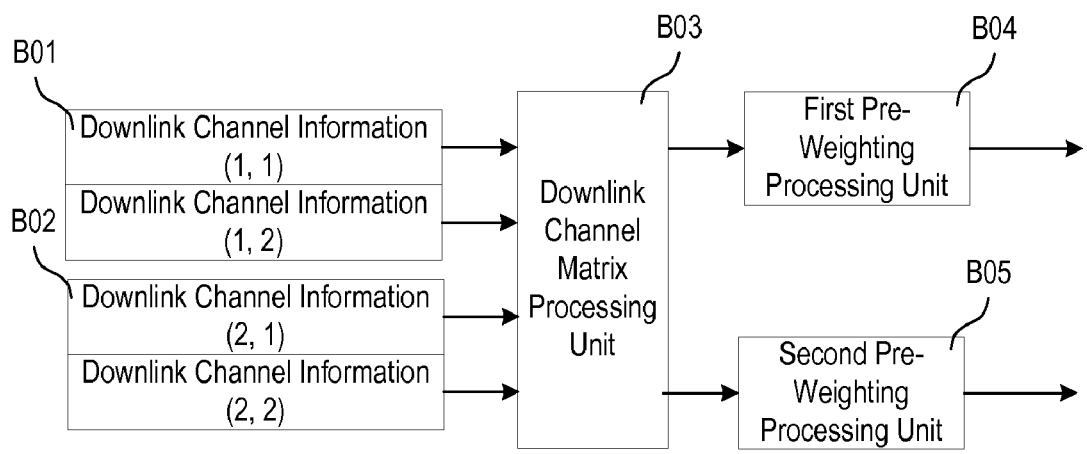
FIG. 8 is a structural representation of a downlink channel matrix processing module according to Embodiment 2 of the invention.

FIG. 8 is a structural representation of the downlink channel matrix processing module B0 according to Embodiment 2 of the invention. As shown in FIG. 8, the downlink channel matrix processing module B0 includes a first group channel information unit B01, a second group channel information unit B02, a downlink channel matrix processing unit B03, a first pre-weighting processing unit B04 and a second pre-weighting processing unit B05. Where, the first group channel information unit B01 is adapted to obtain the first group of downlink channel information according to a receiving signal or feedback information of the first antenna array B13, where the first group of downlink channel information includes 2 downlink channel information experienced by signals corresponding to 2 receiving antennas of the mobile terminal: downlink channel information (1, 1) and downlink channel information (1, 2), where the downlink channel information (1, 1) corresponds to the first antenna array and the first receiving antenna of the target mobile terminal, and the downlink channel information (1, 2) corresponds to the first antenna array and the second receiving antenna of the target mobile terminal; the second group channel information unit B02 is adapted to obtain the second group of downlink channel information according to a receiving signal or feedback information of the second antenna array B23, where the second group of downlink channel information includes 2 downlink channel information experienced by signals corresponding to 2 receiving antennas of the mobile terminal: downlink channel information (2, 1) and downlink channel information (2, 2), where the downlink channel information (2, 1) corresponds to the second antenna array and the first receiving antenna of the target mobile terminal, and the downlink channel information (2, 2) corresponds to the second antenna array and the second receiving antenna of the target mobile terminal.

The downlink channel matrix processing unit B03 forms a 2×2 downlink channel matrix according to the above downlink channel information (1, 1), the downlink channel information (1, 2), the downlink channel information (2, 1) and the downlink channel information (2, 2), and performs singular value decomposition on the downlink channel matrix; the first pre-weighting processing unit B04 receives the singular value decomposition results from the downlink channel matrix processing unit B03, selects a first element of an input vector corresponding to a specific singular value to perform the pre-weighting processing on the transmission signal, and transmits the pre-weighting processing result to the first beamforming module B12; the second pre-weighting processing unit B05 receives the singular value decomposition results from the downlink channel matrix processing unit B03, selects a second element of an input vector corresponding to a specific singular value to perform the pre-weighting processing on the transmission signal, and transmits the pre-weighting processing result to the second beamforming module B22. Specifically, the above specific singular value may be the maximum eigenvalue; that is, the first pre-weighting processing unit B04 may select the first element of an input vector corresponding to the maximum singular value for performing the pre-weighting processing on the transmission signal, and the second pre-weighting processing unit B05 may select the second element of an input vector corresponding to the maximum singular value for performing the pre-weighting processing on the transmission signal. By the above processing, in Embodiment 2 of the invention, singular value decomposition may be performed on the downlink channel matrix to obtain an input vector corresponding to the maximum singular value, which may be taken as the pre-weighting vector of the transmission signal of each group of antennas.

Figure 9A:
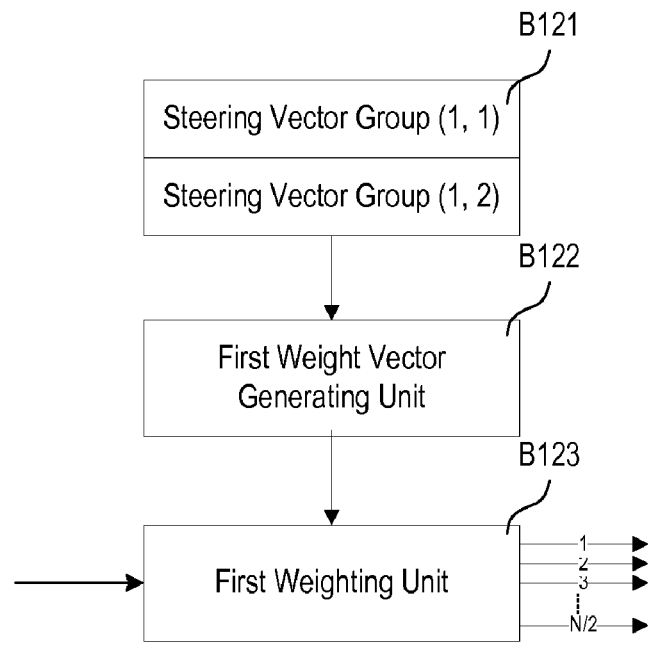
FIG. 9a is a structural representation of a first beamforming module according to Embodiment 2 of the invention.
Figure 9B:
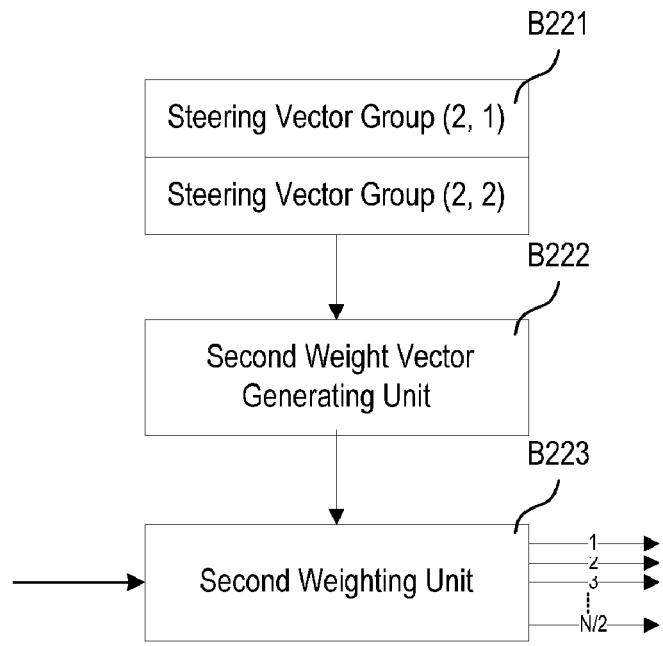
FIG. 9b is a structural representation of a second beamforming module according to Embodiment 2 of the invention.

FIG. 9a is a structural representation of the first beamforming module according to Embodiment 2 of the invention, and FIG. 9b is a structural representation of the second beamforming module according to Embodiment 2 of the invention. As shown in FIG. 9a, the first beamforming module B12 includes a first cluster steering vector unit B121, a first weight vector generating unit B122 and a first weighting unit B123 connected in turn; where the first weighting unit B123 is respectively connected with the first pre-weighting processing unit B04 of the downlink channel matrix processing module B0 and the first antenna array B13. The first cluster steering vector unit B121 is adapted to obtain the first cluster of steering vectors corresponding to the first antenna array B13 according to a receiving signal of the first antenna array B13, where the first cluster of steering vectors include two steering vector groups of the first antenna array B13 corresponding to the two receiving antennas of the mobile terminal: a steering vector group (1, 1) and a steering vector group (1, 2), where the steering vector group (1, 1) corresponds to the first antenna array and the first receiving antenna of the mobile terminal, the steering vector group (1, 2) corresponds to the first antenna array and the second receiving antenna of the mobile terminal; the first weight vector generating unit B122 is adapted to generate a downlink beamforming weight vector of the first antenna array corresponding to the two receiving antennas of the target mobile terminal according to the steering vector group (1, 1) and the steering vector group (1, 2); the first weighting unit B123 is adapted to receive the pre-weighting processed transmission signal from the first pre-weighting processing unit B04, perform the weighting processing on the pre-weighting processed transmission signal according to the downlink beamforming weight vectors of the first antenna array, transmit N/2 output signals to the first antenna array B13, and transmit the first directional beam directed to the two receiving antennas B10 of the target mobile terminal via the first antenna array B13, where the first directional beam may include a directional beam (1, 1) and a directional beam (1, 2), where the directional beam (1, 1) is a directional beam of the first antenna array directed to the first receiving antenna of the target mobile terminal, and the directional beam (1, 2) is a directional beam of the first antenna array directed to the second receiving antenna of the target mobile terminal. As shown in FIG. 9b, the second beamforming module B22 includes a second cluster steering vector unit B221, a second weight vector generating unit B222 and a second weighting unit B223 connected in turn; where the second weighting unit B223 is respectively connected with the second pre-weighting processing unit B05 of the downlink channel matrix processing module B0 and second antenna array B23. The second cluster steering vector unit B221 is adapted to obtain the second cluster of steering vectors corresponding to the second antenna array B23 according to a receiving signal of the second antenna array B23, where the second cluster of steering vectors include two steering vector groups of the second antenna array B23 corresponding to two receiving antennas of the mobile terminal: a steering vector group (2, 1) and a steering vector group (2, 2), where the steering vector group (2, 1) corresponds to the second antenna array and the first receiving antenna of the mobile terminal, and the steering vector group (2, 2) corresponds to the second antenna array and the second receiving antenna of the mobile terminal; the second weight vector generating unit B222 is adapted to generate a downlink beamforming weight vector of the second antenna array corresponding to the two receiving antennas of the target mobile terminal according to the steering vector group (2, 1) and the steering vector group (2, 2); the second weighting unit B223 is adapted to receive the pre-weighting processed transmission signal from the second pre-weighting processing unit B05, perform the weighting processing on the pre-weighting processed transmission signal according to the downlink beamforming weight vectors of the second antenna array, transmit N/2 output signals to the second antenna array B23, and transmit the second directional beam directed to the two receiving antennas B10 of the target mobile terminal via the second antenna array B23, where the second directional beam may include a directional beam (2, 1) and a directional beam (2, 2), where the directional beam (2, 1) is a directional beam of the second antenna array directed to the first receiving antenna of the target mobile terminal, and the directional beam (2, 2) is a directional beam of the second antenna array directed to the second receiving antenna of the target mobile terminal.

Figure 10:
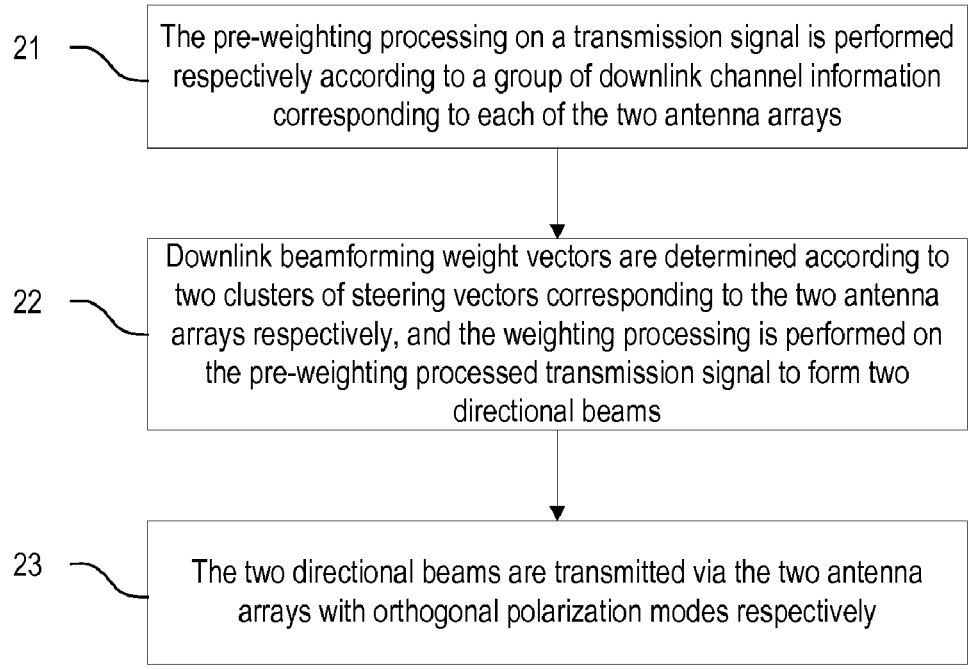
FIG. 10 is a flow chart of a method for community antenna in a closed loop mode when a mobile terminal has multiple antennas according to Embodiment 2 of the invention.
Figure 11:
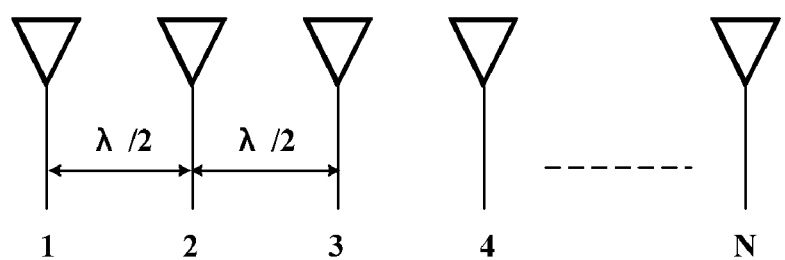
FIG. 11 is a schematic diagram of a smart antenna array in a TD-SCDMA system in the prior art.

FIG. 10 is a flow chart of a method for community antenna in a closed loop mode when a mobile terminal has multiple antennas according to Embodiment 2 of the invention, the method includes:

Process 21: the pre-weighting processing on a transmission signal is performed respectively according to a group of downlink channel information corresponding to each of the two antenna arrays;

Process 22: downlink beamforming weight vectors are determined according to two clusters of steering vectors corresponding to the two antenna arrays respectively, and the weighting processing is performed on the pre-weighting processed transmission signal to form two directional beams; and Process 23: the two directional beams are transmitted via the two antenna arrays with orthogonal polarization modes respectively.

Where, each group of downlink channel information includes M downlink channel information corresponding to the M receiving antennas of the target mobile terminal, each cluster of steering vectors include M steering vector groups corresponding to the M antennas of the mobile terminal, and each directional beam includes the downlink directional beams directed to the M receiving antennas of the target mobile terminal respectively.

The method for community antenna in the closed loop mode when the mobile terminal has multiple antennas according to Embodiment 2 of the invention is realized on the basis of two broad-sense transmitting antennas formed by the first antenna array and the second antenna array, where the first antenna array and the second antenna array respectively include N/2 antenna array elements with the same polarization mode, and the space between each antenna array element is less than or equal to $\lambda/2$, the polarization modes of the first antenna array and the second antenna array are orthogonal to each other, thus these two broad-sense antennas are independent from each other, so that a broad-sense MIMO system (2×M MIMO system) may be formed. Under the structure of the two broad-sense transmitting antennas formed by the first antenna array and the second antenna array according to Embodiment 2 of the invention, the first antenna array may obtain the first group of channel information corresponding to the first antenna array according to a receiving signal or feedback information with an independent fading that is received, and obtain the first cluster of steering vectors corresponding to the first antenna array according to the receiving signal; and the second antenna array may obtain the second group of channel information corresponding to the second antenna array according to a receiving signal or feedback information with an independent fading that is received, and obtain the second cluster of steering vectors corresponding to the second antenna array according to the receiving signal, where each group of downlink channel information includes M downlink channel information corresponding to the M receiving antennas of the target mobile terminal, and each cluster of steering vectors include M steering vector groups corresponding to the M antennas of the mobile terminal. Based on this, a 2×M downlink channel matrix may be obtained according to the first group of channel information and the second group of channel information, the weighting processing is performed on the pre-weighting processed transmission signal by using the downlink beamforming weight vector determined via a cluster of steering vectors of each antenna array after performing singular value decomposition on the downlink channel matrix to form two directional beams directed to the M receiving antennas of the target mobile terminal and the two directional beams are transmitted via the corresponding broad-sense antennas respectively, so that a large transmission diversity gain and an array gain may be obtained, and a good performance may be obtained. As a method for community antenna of a smart antenna system and an MIMO/MISO system, the method for community antenna in the closed loop mode according to Embodiment 2 of the invention can not only keep the basic structure of the smart antenna array elements, but also obtain the diversity gains and array gains that can be attained via the MIMO technology, so that the requirement on the integration of the smart antenna technology and the MIMO technology may be well met, and the terminals in an on-going commercial TD-SCDMA system and the terminals in a future system using the MIMO technology may simultaneously work in the system according to Embodiment 2 of the invention, thereby realizing seamless access; moreover, the evolution of the future antenna system may be made much smoother, thus the large-scale reconstruction and modification that may appear during the future system evolution process can be avoided.

In the technical solution shown in FIG. 10, Process 21 includes:

Process 211: two groups of downlink channel information are obtained according to receiving signals or feedback information of the two antenna arrays;

Process 212: a downlink channel matrix is obtained according to the two groups of downlink channel information, and the singular value decomposition is performed on the downlink channel matrix;

Process 213: two elements of an input vector corresponding to a specific singular value according to the singular value decomposition result of the downlink channel matrix to perform the pre-weighting processing on the transmission signals respectively, and two pre-weighting processed transmission signals are obtained.

Where, the two groups of downlink channel information include the first group of downlink channel information corresponding to the first antenna array and the second group of downlink channel information corresponding to the second antenna array. The first group of downlink channel information includes M downlink channel information corresponding to the M receiving antennas of the target mobile terminal: downlink channel information (1, 1), downlink channel information (1, 2), . . . , and downlink channel information (1, M), where the downlink channel information (1, M) corresponds to the first antenna array and the $M^{th}$ receiving antenna of the target mobile terminal. The second group of downlink channel information includes M downlink channel information corresponding to the M receiving antennas of the target mobile terminal: downlink channel information (2, 1), downlink channel information (2, 2), . . . , and downlink channel information (2, M), where the downlink channel information (2, M) corresponds to the second antenna array and the $M^{th}$ receiving antenna of the target mobile terminal.

A 2×M downlink channel matrix may be formed according to the above downlink channel information (1, 1), downlink channel information (1, 2), . . . , downlink channel information (1, M) and the downlink channel information (2, 1), downlink channel information (2, 2), . . . , downlink channel information (2, M), and the singular value decomposition may be performed on the downlink channel matrix. Thereafter, the pre-weighting processing may be respectively performed on the results of the singular value decomposition, for the first antenna array, a first element of an input vector corresponding to a specific singular value may be selected to perform the pre-weighting processing on a transmission signal; for the second antenna array, a second element of an input vector corresponding to a specific singular value may be selected to perform the pre-weighting processing on a transmission signal. In this embodiment, the pre-weighting processing is a transmission processing based on the dominant eigenvalue. That is, two elements of the input vector corresponding to the maximum singular value are selected to perform the pre-weighting processing on the transmission signals respectively.

In the technical solution shown in FIG. 10, Process 22 includes:

Process 221: two clusters of steering vectors are obtained according to the receiving signals of the two antenna arrays;

Process 222: downlink beamforming weight vectors of the two antenna arrays corresponding to the M receiving antennas of the target mobile terminal are generated according to the two clusters of steering vectors respectively; and Process 223: the weighting processing on the two pre-weighting processed transmission signals is performed respectively according to the downlink beamforming weight vectors of the two antenna arrays to form two directional beams.

Where, the two clusters of steering vectors include the first cluster of steering vectors corresponding to the first antenna array and the second cluster of steering vectors corresponding to the second antenna array. The first cluster of steering vectors include M steering vector groups corresponding to the first antenna array: a steering vector group (1, 1), a steering vector group (1, 2), . . . , and a steering vector group (1, M), where the steering vector group (1, M) corresponds to the first antenna array and the $M^{th}$ receiving antenna of the mobile terminal. The second cluster of steering vectors include M steering vector groups corresponding to the second antenna array: a steering vector group (2, 1), a steering vector group (2, 2), . . . , and a steering vector group (2, M), where the steering vector group (2, M) corresponds to the second antenna array and the $M^{th}$ receiving antenna of the mobile terminal.

The downlink beamforming weight vector of the antenna array corresponding to the M receiving antennas of the target mobile terminal may be obtained according to each cluster of steering vectors, the weighting processing may be performed on the pre-weighting processed transmission signal, N/2 output signals may be transmitted to each of the two antenna arrays, and two directional beams directed to the M receiving antennas of the target mobile terminal may be transmitted via the two antenna arrays. The two directional beams include the first directional beam transmitted by the first antenna array and the second directional beam transmitted by the second antenna array. The first directional beam includes a directional beam (1, 1), a directional beam (1, 2), . . . , and a directional beam (1, M), where the directional beam (1, M) is a directional beam of the first antenna array directed to the $M^{th}$ receiving antenna of the target mobile terminal. The second directional beam includes a directional beam (2, 1), a directional beam (2, 2), . . . , and a directional beam (2, M), where the directional beam (2, M) is a directional beam of the second antenna array directed to the $M^{th}$ receiving antenna of the target mobile terminal.

Finally, it should be noted that, the above embodiments are used to illustrate the technical solutions of the invention only, rather than to limit the scope of the invention. Although the invention has been illustrated in detail by referring to the preferred embodiments, it should be understood by those skilled in the art that various modifications and equivalences may be made on the technical solutions of the invention without departing from the spirit and the scope of the invention.

The invention claimed is:

1. A community antenna system in a closed loop mode when a mobile terminal has multiple antennas, comprising:

a downlink channel matrix processing module, adapted to perform the pre-weighting processing on transmission signals according to a first group of downlink channel information corresponding to a first antenna array and a second group of downlink channel information corresponding to a second antenna array;

a first beamforming module, adapted to perform the weighting processing on the pre-weighting processed transmission signal according to a downlink beamforming weight vector generated via the first cluster of steering vectors corresponding to a first antenna array to form a first directional beam directed to the target mobile terminal and transmit the first directional beam via the first antenna array;

a second beamforming module, adapted to perform the weighting processing on the pre-weighting processed transmission signal according to a downlink beamforming weight vector generated via the second cluster of steering vectors corresponding to a second antenna array to form a second directional beam directed to the target mobile terminal and transmit the second directional beam via the second antenna array;

a first antenna array, in which antenna array elements have the same polarization mode, adapted to transmit the first directional beam; and a second antenna array, in which antenna array elements have the same polarization mode that is orthogonal to that of the first antenna array, adapted to transmit the second directional beam;

wherein the downlink channel matrix processing module comprises:

a first group channel information unit, adapted to obtain the first group of downlink channel information according to a receiving signal or feedback information of the first antenna array, wherein the first group of downlink channel information comprises M downlink channel information corresponding to M receiving antennas of a target mobile terminal, and M is a positive integer;

a second group channel information unit, adapted to obtain the second group of downlink channel information according to a receiving signal or feedback information of the second antenna array, wherein the second group of downlink channel information comprises M downlink channel information corresponding to M receiving antennas of a target mobile terminal;

a downlink channel matrix processing unit, adapted to obtain a downlink channel matrix according to the first group of downlink channel information and the second group of downlink channel information, and perform singular value decomposition on the downlink channel matrix;

a first pre-weighting processing unit, adapted to select a first element of an input vector corresponding to a specific singular value according to the singular value decomposition result of the downlink channel matrix processing unit to perform the pre-weighting processing on a transmission signal, and transmit the pre-weighting processed transmission signal to the first beamforming module; and a second pre-weighting processing unit, adapted to select a second element of an input vector corresponding to a specific singular value according to the singular value decomposition result of the downlink channel matrix processing unit to perform the pre-weighting processing on a transmission signal, and transmit the pre-weighting processed transmission signal to the second beamforming module.

2. The community antenna system in the closed loop mode of claim 1, wherein, the singular values in the first pre-weighting processing unit and the second pre-weighting processing unit are maximum singular values.

3. The community antenna system in the closed loop mode of claim 1, wherein, the numbers of antenna array elements in the first antenna array and the second antenna array are the same, and the space between each antenna array element in each antenna array is less than or equal to ½ wavelength.

4. The community antenna system in the closed loop mode of claim 1, wherein:

the first beamforming module comprises:
a first cluster steering vector unit, adapted to obtain the first cluster of steering vectors according to a receiving signal of the first antenna array, wherein the first cluster of steering vectors comprise M steering vector groups corresponding to M antennas of the mobile terminal, and M is a positive integer;
a first weight vector generating unit, adapted to generate, according to the first cluster of steering vectors, a downlink beamforming weight vector of the first antenna array corresponding to the M receiving antennas of the target mobile terminal; and
a first weighting unit, adapted to perform the weighting processing on the pre-weighting processed transmission signal from the downlink channel matrix processing module according to the downlink beamforming weight vector of the first antenna array corresponding to the M receiving antennas of the target mobile terminal, and transmit the first directional beam via the first antenna array, wherein the first directional beam includes downlink directional beams directed to the M receiving antennas of the target mobile terminal respectively;

the second beamforming module comprises:
a second cluster steering vector unit, adapted to obtain the second cluster of steering vectors according to a receiving signal of the second antenna array, wherein the second cluster of steering vectors include M steering vector groups corresponding to the M antennas of the mobile terminal, and M is a positive integer;
a second weight vector generating unit, adapted to generate, according to the second cluster of steering vectors, a downlink beamforming weight vector of the second antenna array corresponding to the M receiving antennas of the target mobile terminal; and
a second weighting unit, adapted to perform the weighting processing on the pre-weighting processed transmission signal from the downlink channel matrix processing module according to the downlink beamforming weight vector of the second antenna array corresponding to the M receiving antennas of the target mobile terminal, and transmit the second directional beam via the second antenna array, wherein the second directional beam includes downlink directional beams directed to the M receiving antennas of the target mobile terminal respectively.

5. A method for community antenna in a closed loop mode when a mobile terminal has multiple antennas, comprising:
performing the pre-weighting processing on a transmission signal according to two groups of downlink channel information corresponding to two antenna arrays;
determining two downlink beamforming weight vectors according to two clusters of steering vectors corresponding to the two antenna arrays, and performing the weighting processing on the pre-weighting processed transmission signal to form two directional beams; and
transmitting the two directional beams via two antenna arrays with orthogonal polarization modes;
wherein the process of performing the pre-weighting processing on a transmission signal according to two groups of downlink channel information corresponding to two antenna arrays comprises:
obtaining two groups of downlink channel information according to receiving signals or feedback information of the two antenna arrays;
obtaining a downlink channel matrix according to the two groups of downlink channel information, and performing singular value decomposition on the downlink channel matrix; and
selecting two elements of an input vector corresponding to a specific singular value according to the singular value decomposition result of the downlink channel matrix to performing the pre-weighting processing on the transmission signals respectively, and obtaining two pre-weighting processed transmission signals.

6. The method for community antenna in the closed loop mode of claim 5, wherein, each group of the downlink channel information includes M downlink channel information corresponding to M receiving antennas of a target mobile terminal, and M is a positive integer.

7. The method for community antenna in the closed loop mode of claim 5, wherein, each cluster of steering vectors include M steering vector groups corresponding to M antennas of the mobile terminal.

8. The method for community antenna in the closed loop mode of claim 5, wherein, each of the two directional beams includes downlink directional beams directed to M receiving antennas of the target mobile terminal respectively.

9. The method for community antenna in the closed loop mode of claim 5, wherein, the process of determining two downlink beamforming weight vectors according to two clusters of steering vectors corresponding to the two antenna arrays and performing the weighting processing on the pre-weighting processed transmission signal to form two directional beams comprises:
obtaining two clusters of steering vectors according to receiving signals of the two antenna arrays;
generating the downlink beamforming weight vectors of the two antenna arrays corresponding to M receiving antennas of the target mobile terminal according to the two clusters of steering vectors; and
performing the weighting processing on the two pre-weighting processed transmission signals respectively according to the downlink beamforming weight vectors of the two antenna arrays to form the two directional beams.

* * * * *